(12) United States Patent
Delong et al.

(10) Patent No.: US 11,982,326 B2
(45) Date of Patent: May 14, 2024

(54) NON-RETURN ROTATION TRANSMISSION DEVICE

(71) Applicant: SAFRAN ELECTRONICS & DEFENSE ACTUATION, Auxerre (FR)

(72) Inventors: Joffrey Delong, Moissy-Cramayel (FR); Vincent Longinotti, Moissy-Cramayel (FR)

(73) Assignee: SAFRAN ELECTRONICS & DEFENSE ACTUATION, Auxerre (FR)

( * ) Notice: Subject to any disclaimer, the term of this patent is extended or adjusted under 35 U.S.C. 154(b) by 140 days.

(21) Appl. No.: 17/640,064

(22) PCT Filed: Sep. 3, 2020

(86) PCT No.: PCT/EP2020/074661
§ 371 (c)(1),
(2) Date: Mar. 3, 2022

(87) PCT Pub. No.: WO2021/043934
PCT Pub. Date: Mar. 11, 2021

(65) Prior Publication Data
US 2022/0341473 A1    Oct. 27, 2022

(30) Foreign Application Priority Data
Sep. 5, 2019   (FR) ...................................... 1909786

(51) Int. Cl.
*F16D 41/10*    (2006.01)
*F16D 41/06*    (2006.01)

(52) U.S. Cl.
CPC ...... *F16D 41/10* (2013.01); *F16D 2041/0606* (2013.01)

(58) Field of Classification Search
CPC ......................... F16D 41/10; F16D 2041/0606
See application file for complete search history.

(56) References Cited

U.S. PATENT DOCUMENTS

| 1,845,667 A | 2/1932 | Johnson | |
|---|---|---|---|
| 2015/0107953 A1* | 4/2015 | Lucas | ..................... F16D 41/06 192/46 |

FOREIGN PATENT DOCUMENTS

| EP | 0 370 319 A1 | 5/1990 |
|---|---|---|
| GB | 1171997 A | 11/1969 |
| KR | 10-2016-0027321 A | 3/2016 |

OTHER PUBLICATIONS

English translation of Written Opinion dated Dec. 1, 2020, issued in corresponding International Application No. PCT/EP2020/074661, filed Sep. 3, 2020, 5 pages.

(Continued)

*Primary Examiner* — Terence Boes
(74) *Attorney, Agent, or Firm* — CHRISTENSEN O'CONNOR JOHNSON KINDNESS PLLC

(57) ABSTRACT

A non-return device for coaxial rotation transmission includes coaxial input and output shafts, a frame for guiding the rotation of the shafts. A locking element is urged in radial translation through a channel of the output shaft between a radial locking position, in which the locking element projects from the channel so as to prevent a rotation of the output shaft by abutting against the frame, and a radial unlocking position, in which the locking element is retracted so as to allow axial rotation of the output shaft. The input shaft includes means for radially switching the locking element between the locking and unlocking positions thereof.

8 Claims, 5 Drawing Sheets

(56) References Cited

OTHER PUBLICATIONS

International Preliminary Report on Patentability dated Mar. 8, 2022, issued in corresponding International Application No. PCT/EP2020/074661, filed Sep. 3, 2020, 6 pages.
International Search Report dated Dec. 1, 2020, issued in corresponding International Application No. PCT/EP2020/074661, filed Sep. 3, 2020, 6 pages.
Written Opinion dated Dec. 1, 2020, issued in corresponding International Application No. PCT/EP2020/074661, filed Sep. 3, 2020, 5 pages.

* cited by examiner

NON-RETURN ROTATION TRANSMISSION DEVICE

FIELD OF THE DISCLOSURE

The present disclosure relates to rotation transmitting devices enabling the transmission of a rotational movement in one direction of an input shaft leading to a driven output shaft.

The present disclosure aims to provide an attachment for numerous existing rotary drive devices, in one or two directions of rotation.

BACKGROUND

The known devices for transmitting rotation enabling transmission of a rotational movement in one direction, from an input shaft to an output shaft, are generally friction devices, which hinders the operation of the system on which they are inserted and does not enable a robustness of the stop elements in rotation of the output shaft. Moreover, the known devices often require an input of external energy for the non-return function.

SUMMARY

The object of the disclosure is to overcome at least one of the above-mentioned disadvantages and to provide a non-return device for transmitting a coaxial rotational movement between two shafts which are entirely mechanical and which are configured to combine the advantages of robustness, adaptability and compactness.

In view of the above, an object of the disclosure is a non-return device for transmitting a rotational movement including two coaxial input and output shafts, a frame for guiding the rotation of the shafts, a locking element that can move in radial translation through a channel of the output shaft, between a locking position in which the locking element projects out of the channel so as to prevent a rotation of the output shaft, and an unlocking position in which the locking element is retracted so as to allow axial rotation of the output shaft, the input shaft including means for switching the locking element between its locking and unlocking position.

Preferably, the switching means of the locking element include a cam having a profile designed to move the locking element radially during a rotation of the input shaft.

For example, the cam is provided on a male end of the input shaft, the male end being engaged in a female end of the output shaft.

Advantageously, the input shaft comprises a shoulder coming into abutment against a flat portion of the output shaft in order to rotate the output shaft, the reaching of the abutment by the shoulder during rotation of the input shaft coinciding angularly with the placing of the locking element in the unlocked position by the cam.

According to an embodiment, the switching means of the locking element include an unlocking key interposed between the cam and the locking element, the key being connected in translation through the channel of the output shaft.

In an embodiment the unlocking key is entirely housed in the channel of the output shaft in the unlocking position.

Advantageously, the device includes elastic return means to the locking position of the locking element, working in compression in order to push the locking element towards the axis of the shafts counter to the cam or, where appropriate, counter to the unlocking key.

Preferably, the elastic return means to the locked position include a spring connected to the frame.

In addition, the frame can comprise a passage coinciding with the channel of the output shaft in the locking position, the locking element and the unlocking key being able to move radially in translation through the passage (41) in the locking position.

The disclosure also relates to a device in which a rotating of the output shaft by the input shaft and a passage into the unlocked position occur substantially simultaneously after a rotating of the input shaft through at least one quarter turn.

DESCRIPTION OF THE DRAWINGS

The disclosure will be better understood by detailed studying of several embodiments taken in a non-limiting manner and illustrated in the attached figures, wherein.

DETAILED DESCRIPTION

Figure 1A:
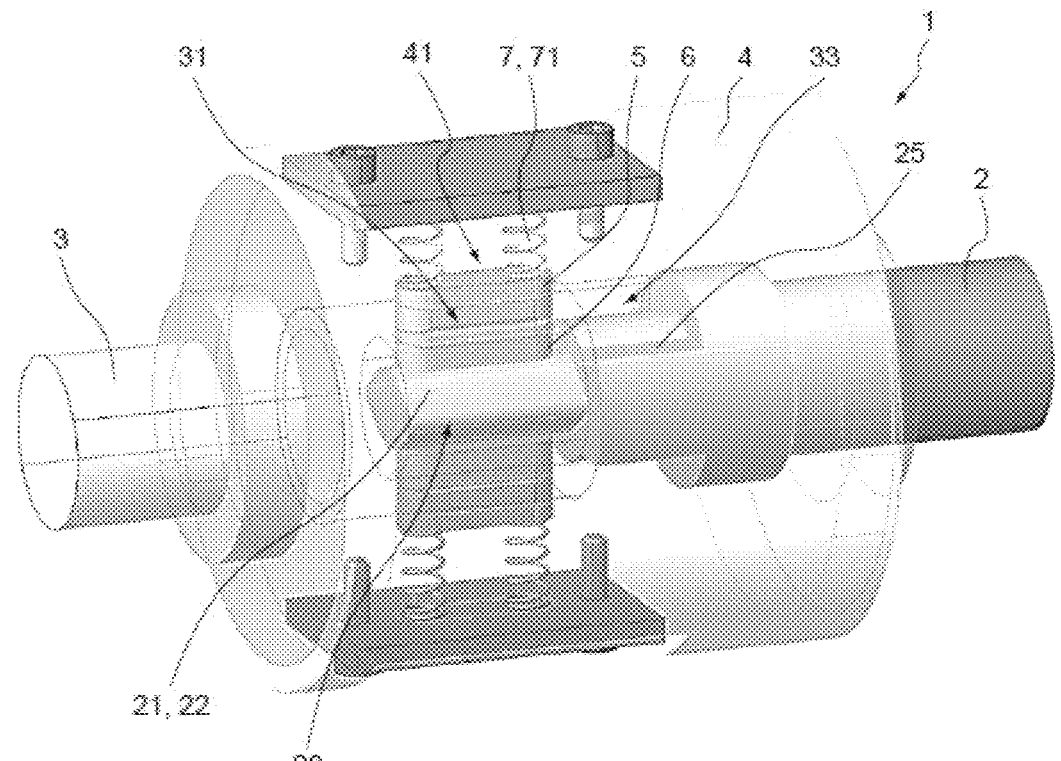
FIG. 1A shows the non-return device for coaxial transmission of rotation according to a first embodiment.
Figure 1B:
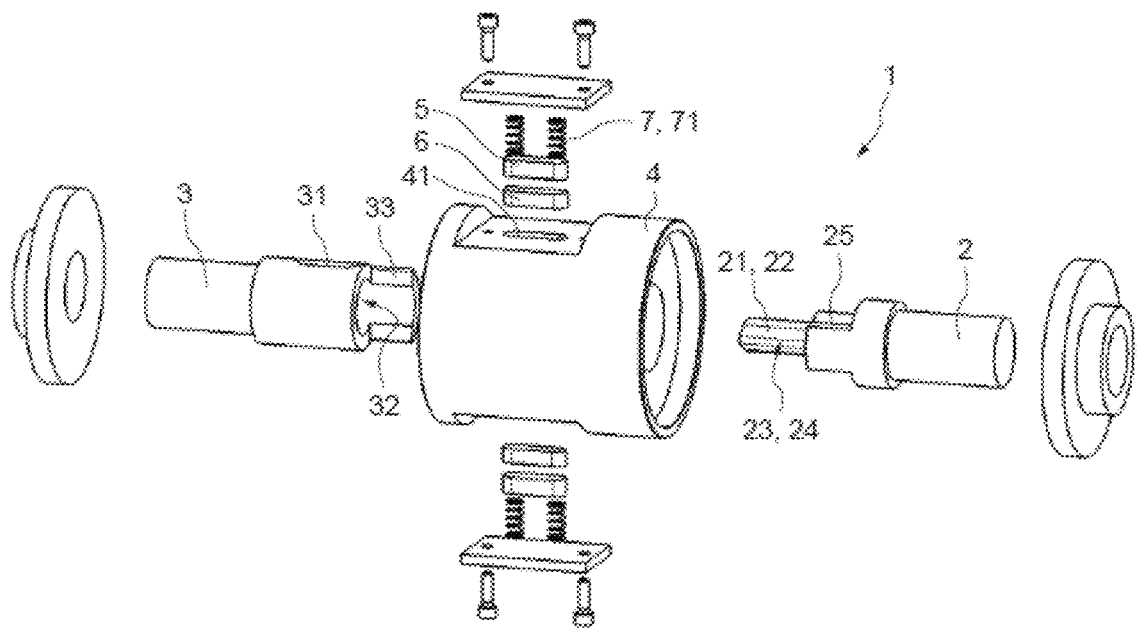
FIG. 1B shows an exploded view of the device of FIG. 1A.

FIG. 1 illustrates a non-return device for transmitting a rotational movement 1.

This device 1 is intended for transmitting rotation between two shafts by implementing a non-return function, in other words a function preventing transmission of rotation from the output shaft of the input shaft.

The non-return device 1 includes an input shaft 2 and an output 3 shaft, arranged coaxially, and a frame 4 guiding the rotation of the shafts 2, 3.

The shafts 2, 3 can be inserted in an existing system (not shown), which includes, for example, a shaft driven in rotation on which it is desired to add a non-return function and a driven shaft to which the input 2 and output 3 shafts are respectively connected.

The shafts include means for mutual cooperation for the transmission of an axial rotational movement from one to the other. The input shaft 2 is intended, in particular, to drive the output shaft 3.

For example, the input shaft includes a male end 24 engaged in a female end 32 of the output shaft 3.

Figure 2A:
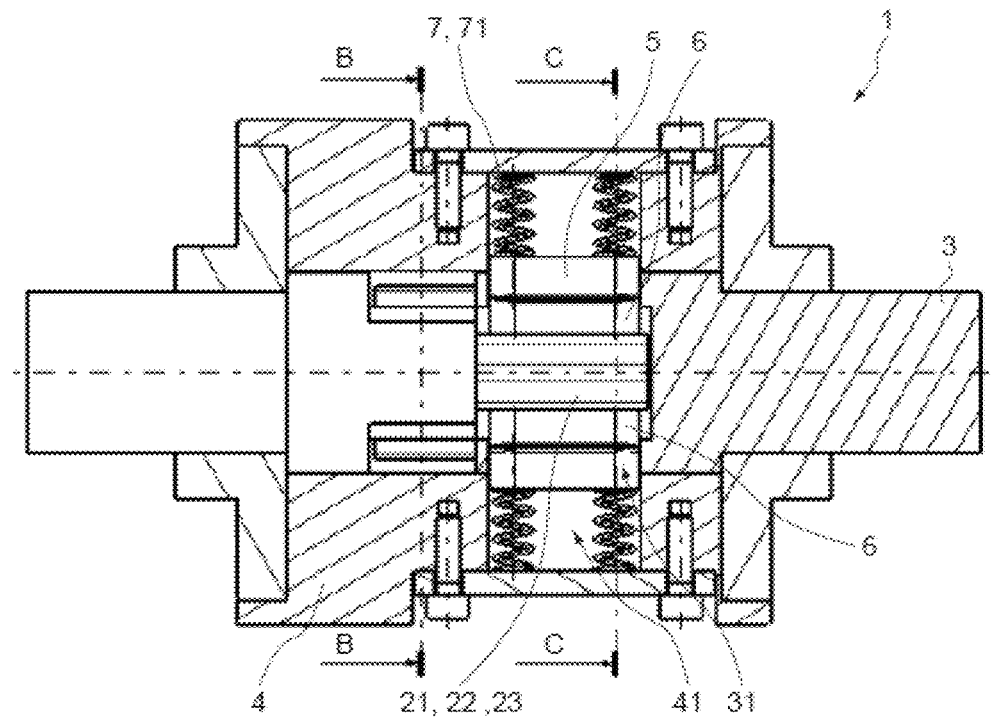
FIG. 2A shows a longitudinal sectional view of the device of FIG. 1A in the locked position.

As illustrated in FIG. 2A, the frame 4 can support and guide rotation of the shafts 2, 3, for example by means of plain bearings or roller bearings.

A locking element 5 is inserted in a transverse channel 31 of the output shaft 3. The locking element 5 can translate radially through the channel 31, between a radial position, referred to as the locking position, and a radial position referred to as the unlocking position.

Figure 2B:
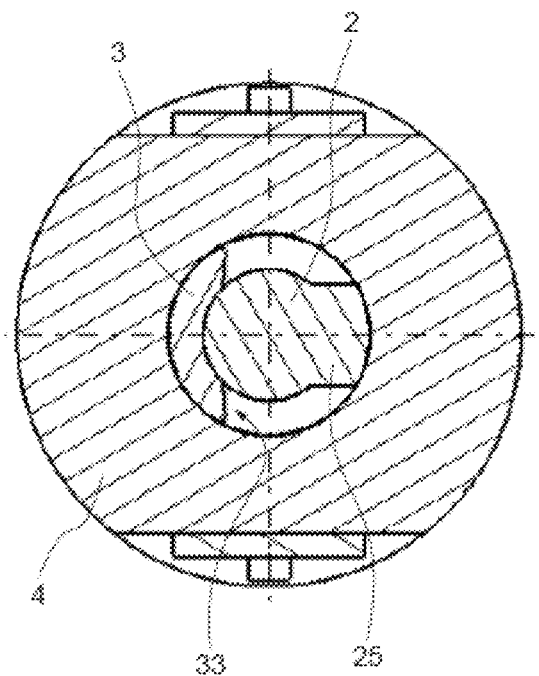
FIG. 2B shows a first cross-sectional view of the locked device of FIG. 2A.
Figure 2C:
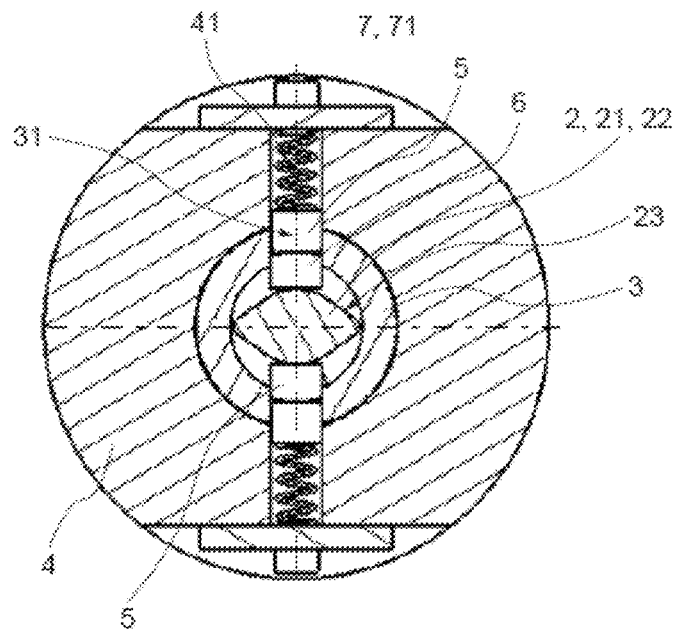
FIG. 2C shows a second cross-sectional view of the locked device of FIG. 2A.

In the locking position illustrated in FIGS. 2A, 2B and 2C, the locking element 5 projects out of the channel 31. It thus prevents rotation of the output shaft 2 by abutting against the frame 4.

In the unlocking position illustrated in FIGS. 3A, 3B, 3C and 4, the locking element 5 is retracted and does not abut against the frame, allowing the axial rotation of the output shaft 3.

For example, the frame includes a passage 41 in which the locking element 5 is retracted in the unlocking position. In the locking position, the passage 41 coincides with the channel 31 of the output shaft 3 and the locking element 5 can then translate radially through the passage 41 so as to retract and allow rotation of the output shaft 2.

The input shaft 2 further includes drive means of the output shaft 3 and radial switching means 21 of the locking element 5 between its radial locking and unlocking positions, through a rotational movement of the input shaft 2. By contrast, the output shaft has no switching means of the locking element 5.

Rotating the input shaft 2 substantially simultaneously drives a rotating of the output shaft 3 and a passage of the locking element 5 into the unlocked position.

Figure 3A:
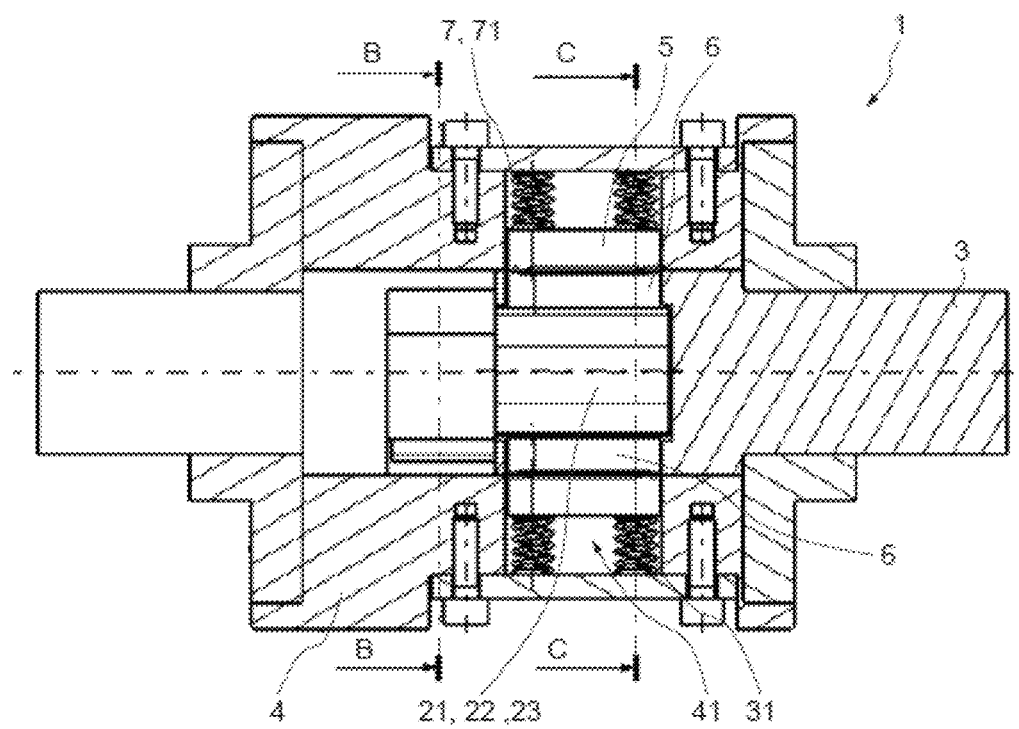
FIG. 3A shows a longitudinal sectional view of the device of FIG. 1A in the unlocked position.
Figure 3B:
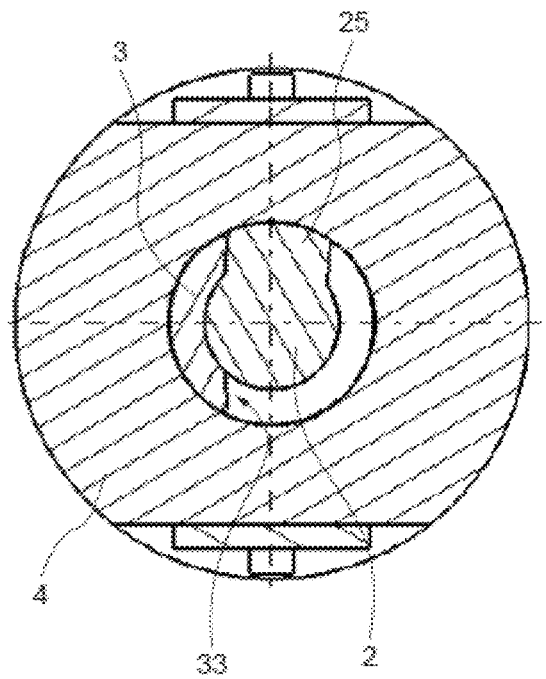
FIG. 3B shows a first cross-sectional view of the unlocked device of FIG. 3A.

Referring to FIGS. 2B and 3B, the input shaft 2 includes, for example, a shoulder 25 coming into abutment against a flat portion 33 of the output shaft 3 in order to rotate the output shaft 3. The reaching of the abutment by the shoulder 25 during rotation of the input shaft 2 coincides angularly with the placing of the locking element 5 in the unlocked position using the switching means 21.

For example, the switching means 21 of the locking element 5 include a cam 22 having a profile 23 designed to move the locking element 5 radially during rotation of the input shaft 2.

Advantageously, the cam 22 is provided on a male end 24 of the input shaft 2, the male end 24 being engaged in a female end 32 of the output shaft 3. The cam 22, engages in the output shaft, thus radially pushing the locking element 5 from the inside of the channel 31 towards the outside of the output shaft 3.

The profile 23 is, for example, a polygon. The number of vertices of the polygon makes it possible to multiply the number of unlocking positions of the device 1.

Figure 3C:
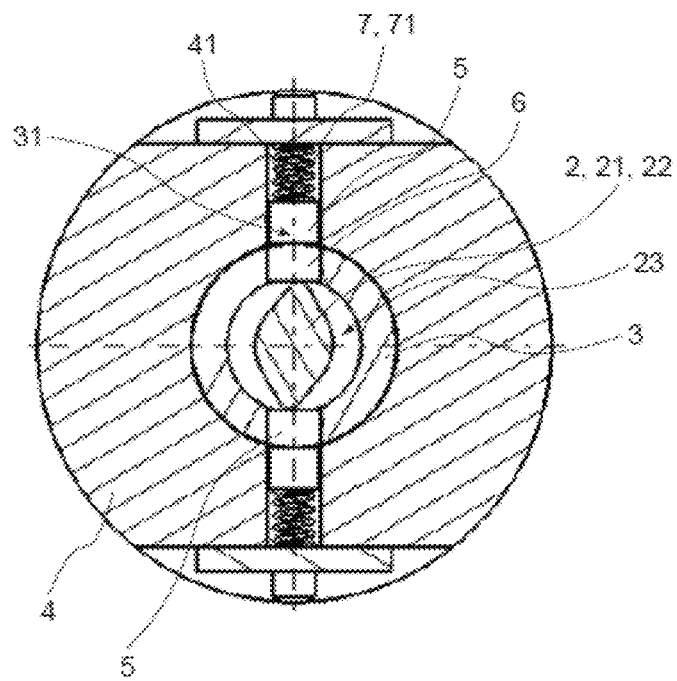
FIG. 3C shows a second cross-sectional view of the unlocked device of FIG. 3A.

In a first embodiment illustrated in FIGS. 2C and 3C, the profile 23 can have a lozenge shape. The locking position (FIG. 2C) is then reached when the cam 22 radially pushes the locking element 5 to the minimum, by its minimum dimension, namely the small height of the lozenge 23, and the unlocking position (FIG. 3C) is reached when the cam 22 radially pushes the locking element 5 to the maximum, by its maximum dimension, namely the large height of the lozenge 23.

Figure 4:
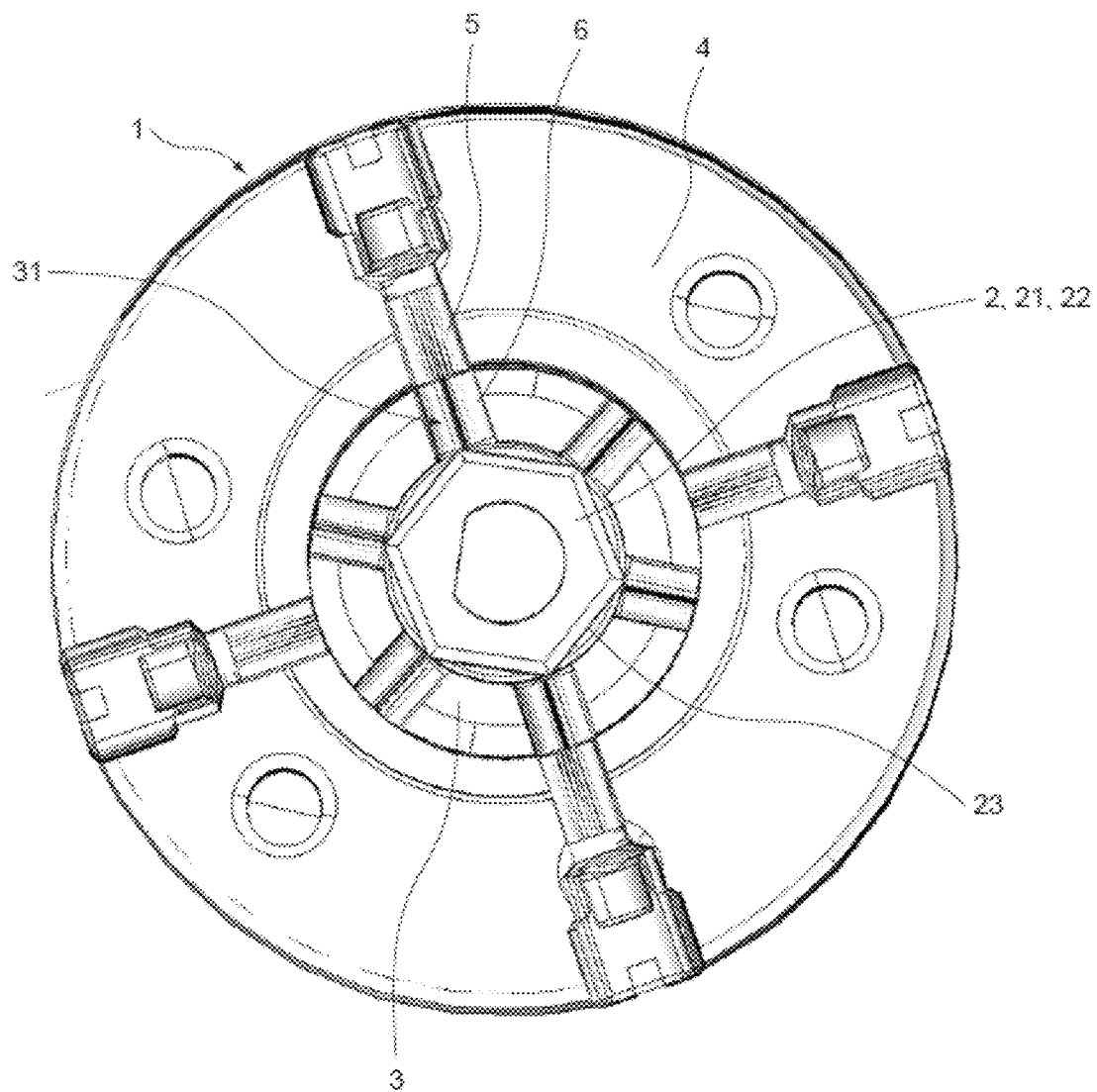
FIG. 4 shows a second embodiment of the non-return device for coaxial transmission of rotation.

In a second embodiment illustrated in FIG. 4, the profile 23 can have a hexagonal section. The unlocking position as illustrated is then reached when the cam 22 radially pushes the locking element 5 by a vertex of the hexagon 23.

Hence, in the first embodiment, a rotation of the input shaft 2 over at least a quarter turn is required in order to unlock and rotate the output shaft 3, while in the second embodiment, a rotation through an angle of twenty degrees is sufficient.

The switching means 21 of the locking element 5 can further include an unlocking key 6 interposed between the cam 22 and the locking element 5. The key 6 is then connected in translation through the channel 31 of the output shaft 3. It serves as a radial pusher of the locking element 5 out of the channel 31.

In the locking position (FIG. 2C), the key 6 is located between the channel 31 and the output shaft 3 and does not dislodge the locking element 5 from the channel 31.

In the unlocking position (FIG. 3C), the key is entirely housed in the channel 31 and completely dislodges the locking element 5 from the channel 31. The key 6 can then turn about the axis of the shafts, integrally with the output shaft 3, the rotation of which is allowed.

The key 6 can have a curved shape, complementary to the channel 31, so as not to protrude out of the channel 31, remaining circumscribed in the channel 21 and so as not to abut against the frame 4 in the unlocking position.

In addition, the device 1 can include elastic return means 7 to the locking position of the locking element 5, working in compression in order to push the locking element 5 towards the axis of the shafts 2, 3 counter to the cam 22.

For example, the elastic return means 7 to the locked position include a spring 71 connected to the frame 4.

Thus, from the unlocking position (FIGS. 3C and 4), once the angular position of the output shaft 3 with respect to the input shaft 2 is such that the channel 21 is aligned with the passage 41, the return means 7 push the locking element 5 against the key 6 in the channel 21. The locked position is then engaged by the projecting positioning of the locking element 5 between the channel 21 and the passage 41, any possibility of rotation of the output shaft 3 being thus prevented.

Hence, the device allows that, in the unlocking position, any transmission in heterokinetic rotation between the input 2 and output 3 shafts, in other words any transmission driven by the output shaft rather than by the drive means of the input shaft 2, causes an alignment of the channel 21 and the passage 41 and thus a return into the locking position using the return means 7.

Thus, a non-return device is produced through which a rotating of the input shaft 2 unlocks the locking means 5 and coaxially transmits the rotational movement to the output shaft 3 driven by the drive means 25, 33, while rotating the output shaft 3 does not rotate the input shaft and triggers a return to the locked position of the device 1.

The invention claimed is:

1. A non-return device for transmitting a rotational movement, comprising coaxial input and output shafts, a frame for guiding the rotation of the shafts, a locking element configured to move in radial translation through a channel of the output shaft between a locking position, in which said locking element projects out of said channel so as to prevent a rotation of the output shaft, and a radial unlocking position, in which the locking element is retracted so as to allow axial rotation of the output shaft, the input shaft including means for switching the locking element between its locking and unlocking positions, the switching means of the locking element including a cam having a profile adapted to move the locking element radially during a rotation of the input shaft, wherein the input shaft comprises a shoulder abutting against a flat portion of the output shaft in order to rotate the output shaft, the reaching of the abutment by the shoulder during a rotation of the input shaft coinciding angularly with the placing of the locking element in the unlocked position by the cam.

2. The device according to claim 1, wherein the cam is provided on a male end of the input shaft, said male end being engaged in a female end of the output shaft.

3. The device according to claim 2, wherein the switching means of the locking element include an unlocking key interposed between the cam and said locking element, said key being connected in translation through the channel of the output shaft.

4. The device according to claim 3, wherein the unlocking key is entirely housed in the channel of the output shaft in the unlocking position.

5. The device according to claim 2, further comprising a spring connected to the frame and configured to bias said locking element towards the axis of the shafts counter to the cam.

6. The device according to claim 5, wherein the frame comprises a passage coinciding with the channel of the output shaft in the locking position, the locking element and the unlocking key being configured to move radially in translation through said passage in the locking position.

7. The device according to claim 1, wherein a rotating of the output shaft by the input shaft and a passage into the unlocked position occur simultaneously after a rotating of said input shaft through at least one quarter turn.

8. The device according to claim 3, further comprising a spring connected to the frame and configured to bias the locking element toward the axis of the shafts counter to the unlocking key.

* * * * *